Patented July 3, 1928.

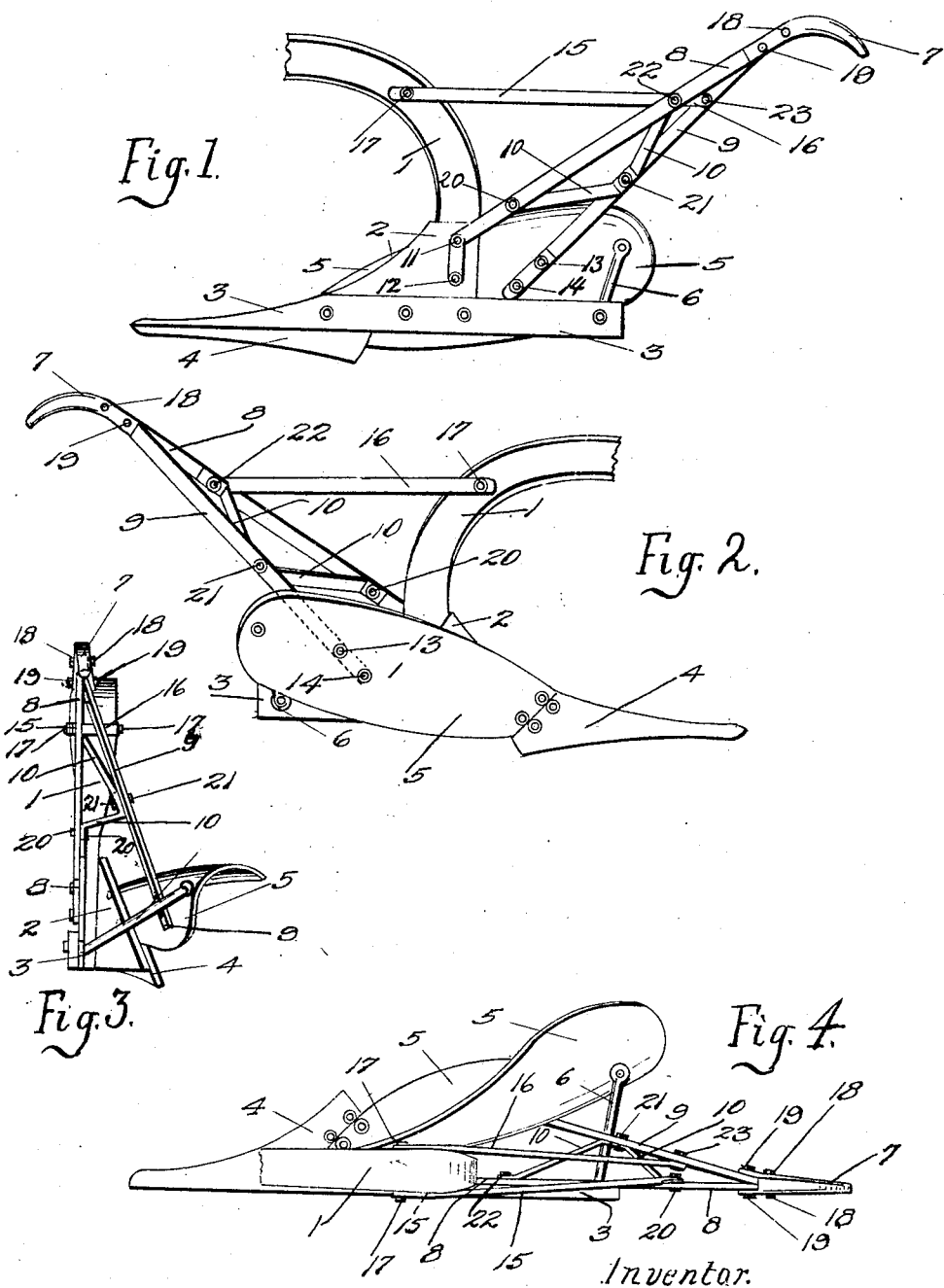

1,675,904

UNITED STATES PATENT OFFICE.

SATURNINO GARCIA NAVÁRRO, OF HABANA, CUBA.

PLOWHANDLE.

Original application filed December 27, 1924, Serial No. 758,393. Divided and this application filed March 1, 1927. Serial No. 171,802.

My invention relates to improvements in plow handle structures, and the objects of my improvement are: first, to provide a compact single handle which enables the plowman to operate the plow with only one hand while with his other hand he can drive the team; second, to provide a single plow handle adapted to cause the exertion directly on the standard, the land side, or the mold-board as needed; and third, to provide a plow handle simple and cheap in construction.

I attain these objects by certain novel features of construction, combination and arrangement of devices hereinafter described and claimed.

In the accompanying drawings, forming part of this specification, Fig. 1 is a left side view of a plow having a handle constructed in accordance with my invention, showing the connection of the handle to the plow-body; Fig. 2 is a right side view of the plow; Fig. 3 represents a rear elevation of the plow; and Fig. 4 is a top plan view of the plow.

Similar numerals refer to similar parts throughout the several views.

In the drawings, 1 represents the standard of the plow, 2 the frog, 3 the land side, 4 the share, 5 the mold-board, and 6 a link which connects the mold-board and the land side.

The handle structure comprises a single handle 7 attached to the upper ends of two straight rods 8 and 9, which are united by an angular link 10. The lower end of the rod 8 is provided with bolt-holes coinciding with other bolt-holes made in the left side of the frog and in the lower portion of the standard 1, said bolt-holes adapted to receive the bolts 11 and 12 which are secured by nuts. The lower end of the rod 9 is properly bent and provided with bolt-holes adapted to receive the bolts 13 and 14 which also pass through coinciding bolt-holes made in the mold-board and are secured by nuts.

Two horizontal parallel rods 15 and 16 unite the upper portion of the rods 8 and 9 with the upper part of the standard 1, to which they are attached by a bolt 17.

The handle 7 is attached to the rods 8 and 9 by rivets 18 and 19. The angular link 10 is secured to the rods 8 and 9 by bolts or rivets 20, 21, and 22; and the horizontal parallel rods 15 and 16 are secured respectively to the rods 8 and 9 by the bolts or rivets 20 and 23.

I do not care to limit the application of my invention to plows alone, as the same may be aptly applied to all forms of cultivators and harvesters employing guiding-handles.

While the construction and operation of the several parts of my invention are simple and cheap, they at the same time accomplish the objects in view.

Having thus described my invention, what I claim as new and desire to secure by Letters Patent is—

In a plow-handle structure, a single handle attached to the upper ends of two straight rods which are united by an angular link and whose lower ends are secured to the lower portion of the plow-standard and the mold-board, while their upper ends are connected to the upper portion of the standard by two parallel horizontal rods.

SATURNINO GARCIA NAVÁRRO.